United States Patent [19]

Bourganel

[11] 3,855,122

[45] Dec. 17, 1974

[54] PROCESS FOR THE PREPARATION OF ANISOTROPIC SEMI-PERMEABLE MEMBRANES OF POLYARYL ETHER/SULPHONES

[75] Inventor: Jack Bourganel, Lyon, France

[73] Assignee: Rhone-Poulenc S.A., Paris, France

[22] Filed: May 19, 1972

[21] Appl. No.: 254,885

[30] Foreign Application Priority Data
May 24, 1971  France .............................. 71.18634

[52] U.S. Cl. ................ 210/23, 210/490, 260/2.2 R, 264/41, 264/49
[51] Int. Cl. ............................................. B01d 13/00
[58] Field of Search ....... 210/22, 23, 321, 490, 500; 264/41, 49; 260/2.2 R

[56] References Cited
UNITED STATES PATENTS

| | | | |
|---|---|---|---|
| 3,709,841 | 1/1973 | Quentin ............................ | 260/2.2 R |
| 3,522,335 | 7/1970 | Rowley ................................. | 264/49 |
| 3,615,024 | 10/1971 | Michaels ....................... | 210/500 X |
| 3,592,672 | 7/1971 | Rowley et al. ................... | 210/500 X |
| 3,567,810 | 3/1971 | Baker.................................... | 264/41 |
| 3,691,068 | 9/1972 | Cross .................................... | 210/22 |
| 3,551,331 | 12/1970 | Cescon et al. ..................... | 264/41 X |
| 3,673,084 | 6/1972 | King et al. ...................... | 210/500 X |

*Primary Examiner*—Frank A. Spear, Jr.
*Attorney, Agent, or Firm*—Stevens, DAvis, Miller & Mosher

[57] ABSTRACT

Anisotropic sulphonated polyaryl ether/sulphone membranes having good salt rejection and flow rates making them particularly suitable for use in osmosis and ultrafiltration are provided by casting a solution of the polymer on a support, immersing the supported film in a coagulating bath and recovering the membrane produced, in which a. the sulphonated polyaryl ether/sulphone used possesses between about 0.1 and 2 meg/g of sulphonic acid groups and a reduced specific viscosity of between about 40 and 200 cm$^3$/g (measured as a 2 g/l solution in dimethylformamide at 25°C.);

b. the concentration of the casting solution is between about 5 and 60% w/v of solution;

c. the coagulation bath consists of either water or an aqueous solution containing about 0.1 to 10% by weight of an amine salt or a quaternary ammonium salt which is soluble in water and in the polymer solution;

d. the temperature of the coagulation bath is between about 0° and 100°C.;

e. the period of immersion in the coagulation bath is between about 30 seconds and 60 minutes;

f. the immersion in the coagulation bath is preceded by gelling the polymer layer; and g. the casting solution optionally contains from about 0.1 to 10% by weight of an amine salt or a quaternary ammonium salt which is soluble in water and in the polymer solution.

23 Claims, No Drawings

PROCESS FOR THE PREPARATION OF ANISOTROPIC SEMI-PERMEABLE MEMBRANES OF POLYARYL ETHER/SULPHONES

The present invention relates to a process for the preparation of anisotropic semi-permeable membranes of sulphonated polyaryl ether/sulphones and to the membranes produced.

The terms "anisotropic" and "asymmetric" are used herein synonymously to denote, in a general manner, membranes the two faces of which have different structures.

Sulphonated polyaryl ether/sulphones have already been described (see, for example, Belgian Pat. No. 749,763), as have the membranes prepared from these polymers. These polymers comprise a plurality of units of the formula:

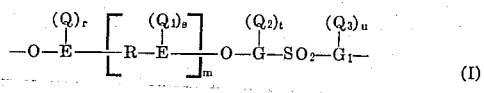
(I)

and, optionally, units of the formula:

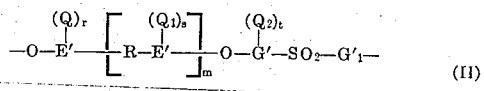
(II)

in which each of E, G and $G_1$, which may be identical or different, is an aromatic group, at least one of which comprises, by way of a substituent, one or more sulphonic acid groups, the number of sulphonic acid groups attached to each aromatic group being the same or different; each of E', G' and $G'_1$, which may be identical or different, differs from E, G and $G_1$ only in the absence of sulphonic acid groups; each of Q and $Q_1$, which may be identical or different represents a substituent which is inert to sulphonation reactions, such as alkyl radicals with 1 to 4 carbon atoms or halogen atoms such as fluorine, chlorine, bromine, or iodine; each of $Q_2$ and $Q_3$, which may be identical or different, represents an electron-attracting group, such as a nitro, phenylsulphone, alkylsulphone, trifluoromethyl, nitroso or pyridyl group; each of $r$, $s$, $t$ and $u$, which may be identical or different, is 0 or an integer from 1 to 4 inclusive, at least one of them being less than 4; $m$ is equal to 0 or 1; and R represents a valency bond or a radical selected from —CO—, —O—, —$SO_2$— and divalent organic hydrocarbon radicals such as alkylene, alkylidene, cycloalkylene and arylene radicals, these radicals preferably having less than 7 carbon atoms.

The sulphonated polyaryl ether/sulphones described in the abovementioned patent contain between 0.1 and 5 milliequivalents per gram (meg/g) of dry polymer of sulphonic acid groups. They can be prepared by the sulphonation, according to any known process, of polyaryl ether/sulphones containing a plurality of units of formula (II). The latter polymers can be prepared as described in French Pat. No. 1,407,301.

It is also known, from this Belgian patent for example, that membranes of sulphonated polyaryl ether/sulphones are particularly useful for the fractionation of solutions by direct or reverse osmosis. Finally, asymmetric membranes of sulphonated polyaryl ether/sulphones, preferably produced by casting a polymer solution and then coagulating one of the faces of the solvent-impregnated film thus produced, have been described in the abovementioned Belgian patent. Such membranes have a thin dense layer forming the active layer of the membrane and a thicker porous layer acting as a reinforcing support.

According to the present invention there is provided a process for producing an asymmetric semi-permeable membrane of a sulphonated polyaryl ether/sulphone which can be used for the fractionation of the different constituents of a solution, especially by direct or reverse osmosis or by ultrafiltration, which allows membranes to be produced which possess particularly advantageous properties, in particular as far as the degree of rejection and the flow rate are concerned.

By "degree of rejection", as used herein, is meant the ratio 100 (1 — concentration of the solution after filtration/concentration of the solution before filtration)

It will be appreciated that the terms "osmosis" and "ultrafiltration" involve, respectively, the fractionation of solutions of compounds of low and high molecular weight. The molecular weight limit of the compounds stopped by the membrane is usually fixed in the vicinity of 500.

The present invention provides a process which comprises casting a solution of a sulphonated polyaryl ether/sulphone into a film, immersing the supported film in a coagulation bath and then recovering the membrane thus produced, in which:

a. the sulphonated polyaryl ether/sulphone used has between 0.1 and 2 meg/g. of sulphonic acid groups and a reduced specific viscosity of betwen 40 and 200 $cm^3/g$. (measured as a 2 g/l solution in dimethylformamide at 25°C.);

b. the concentration of the casting solution is between 5 and 60% (expressed in g. of polymer per $cm^3$ of solution);

c. the coagulation bath consists of water;

d. the temperature of the coagulation bath is between 0°C. and 100°C;

e. the period of immersion in the coagulation bath is between 30 seconds and 60 minutes;

f. the immersion of the film in the coagulation bath is preceded by gelling this film; and g. the polymer solution and/or the coagulation bath contains 0.1 to 10% by weight of an amine salt or a quaternary ammonium salt which is soluble in water and in the polymer solution.

The process of the invention can be applied to the different types of sulphonated polyaryl ether/sulphones containing units of formula I (and optionally II). It should be appreciated that the expression "sulphonic acid" denotes a group of the formula —$SO_3$—, (1/n) $M^{n+}$, M denoting a hydrogen ion or an alkali metal ion or an alkaline earth metal ion and $n$ being an integer equal to 1 or 2.

The polymers which are preferably used are those containing a plurality of units of formulae I and II, in which the symbols E, G and $G_1$ represent p-phenylene groups at least one of which carries, by way of substituents, one or more sulphonic acid groups, E', G' and $G'_1$ each represents a p-phenylene radical, $r$, $s$, $t$ and $u$ are zero, $m$ is equal to 1 and R represents the

radical.

The amine salt or the quaternary ammonium salt can be a salt of an inorganic or organic acid. Suitable salts of inorganic acids include the salts formed by an anion of a strong acid, such as the halides, nitrates, phosphates, sulphates and hydrochlorides and by a cation derived from an amine or by a quaternary ammonium cation. As cations derived from an amine, there may be mentioned those derived from pyridine, triethylamine, triethanolamine, diethanolamine, the picolines, the lutidines, N,N-dimethylaniline and 2-amine-ethanol; as quaternary ammonium cations there may be mentioned the tetraethylammonium and the dimethyldiethylammonium cations.

Preferred salts of organic acids are ammonium salts derived from:

α. a carboxylic polyacid or a carboxylic hydroxyacid, and

β. a polyamine or a quaternary ammonium cation. Examples of such polyacids or hydroxyacids include acids which contain 2 to 10 carbon atoms, such as lactic, citric, maleic, succinic, adipic and tartaric acids and examples of polyamines include primary or secondary diamines or triamines containing 2 to 10 carbon atoms, such as ethylenediamine, diethylenetriamine and hexamethylenediamine.

For the preparation of the solution of sulphonated polyaryl ether/sulphone, the various known solvents of this polymer can be used; in particular, aprotic polar solvents can be used such as dimethylformamide (DMF), dimethylacetamide (DMAC), dimethylsulphoxide (DMSO), hexamethylphosphotriamide (HMPT), sulpholane and ethylene carbonate or mixtures of these solvents. It is also possible, as will be explained later, to use a mixture of one or more of these solvents with a proportion, which can be as much as 50% relative to the total weight of the solvent, of a liquid of low boiling point (for example, less than 90°) which is a solvent or swelling agent for the polymer. Examples of such solvents or mild swelling agents are dichloromethane, acetone, methyl ethyl ketone and tetrahydrofurane.

In order to facilitate the coagulation of the polymer film, a proportion which can be as much as 10% relative to the total weight of the products other than the polymer, of a non-solvent for the latter can also be needed to the casting solution. As examples of such non-solvents, there may be mentioned water, dioxane, urea, formamide, methanol, ethanol, chloroform, isopropyl alcohol and diethyl ether. However, preference is given to water or to products which are miscible with the water of the coagulation bath.

The concentration of the casting solution is preferably between 20 and 55%. Dissolving the polymer and casting it in the form of a film can usually be carried out at ambient temperature (20° to 25°C.). It is however possible to depart from this temperature and, in general, these operations can be carried out at a temperature of between 0° and 100°C.

The support used in order to form the film can be of varied nature and shape; in particular, it can be a plane surface, such as a plate of glass or metal, or a metal belt for continuous manufacture. The support can also be, for example cylindrical, conical, spiral, or any other suitable shape depending on the shape which it is desired to give to the membranes. The support can also be covered with a reinforcement intended to reinforce the membrane. This reinforcement can consist of, for example, a woven fabric, a net or a knitted fabric, which may be of vegetable origin such as cotton or of synthetic such as polyamide or polyester.

The thickness of the membrane after coagulation is substantially different from the thickness of the film measured before the coagulation. After coagulation, the thickness of the membrane is usually between 50 and 400 $\mu$. It depends both on the thickness of the film cast, and on the subsequent treatment conditions (gelling and coagulation). By way of indication the thickness of the film before these treatments is usually between 100 and 500.

Between the stages of casting the film and immersing it in the coagulation bath, the process of the invention comprises gelling the film; the term "gelling" usually denotes the conversion of a layer of polymer solution into a non-fluid state in the absence of stress, the polymer remaining heavily impregnated with solvent and retaining the disordered macromolecular distribution. Various means can be used in order to bring about this gelling. It is thus possible to achieve it by removal of solvent, for example by simple exposure to other atmosphere or, more quickly, by flushing the surface of the film with an anhydrous and inert gas such as dry nitrogen. It is also possible to accelerate the gelling, for either procedure, by gentle heating (for example, up to 50°). These two techniques are particularly effective if the casting solution contains a mild solvent or swelling agent such as those mentioned above. Another way of gelling is to lower the temperature. This technique, which can be used particularly when a mild solvent or swelling agent has not been employed, has the additional advantage of increasing considerably the flow rate of the membranes. In general, the temperature can be lowered to $-30°$, between 0° and $-20°$ being the operating temperature preferably used. The dwell time at this temperature is usually between 30 seconds and 20 minutes, preferably 1 to 10 minutes, and the gelling time in a current of anhydrous and inert gas usually varies between 5 seconds and 10 minutes depending on the temperature.

As has been stated previously, the coagulation bath can consist exclusively of water or it can also contain an amine salt or a quaternary ammonium salt, especially if the casting solution does not contain such a salt. Preferably, the temperature of the coagulation bath is between 0° and 60°C. The duration of the coagulation treatment of the film is preferably between 5 and 30 minutes. When the coagulation is complete, generally within these time limits, the membrane separates from its supports.

The membranes, which may or may not be reinforced, produced according to the process of this invention can be handled and used in an aqueous medium. They can also, and this is one of their most valuable properties, be dried, which greatly facilitates handling them. After rehydration, these membranes substantially recover their former particles. These membranes can be used especially for the ultrafiltration of various solutions, in particular those containing enzymes, proteins, nucleic acids or other heatlabile products which cannot be isolated by distillation. They can also be used in the treatment of sugared juices, fruit juices, meat extracts, beetroot juice, whey, industrial effluents, especially effluents from paper mills, for example.

The membranes of this invention intended for use in the treatment of solutions by osmosis are preferably subjected to a supplementary treatment with the aim of contracting the structure of the membranes. Various means can be employed to achieve this result. In particular, a heat treatment which affects the physical nature of the polymer can be carried out. A practical means of carrying out this treatment consists of immersing the membranes for 1 to 60 minutes in an aqueous solution of an inorganic salt brought to a temperature of between 100° and 150°C., preferably between 125° and 140°C. The concentration of the salt solution is usually between 5 and 70%, preferably between 10 and 60% (g. of salt/cm³ of water). Examples of suitable inorganic salts include sodium, ammonium, calcium, aluminum and zinc nitrates and sulphates, lithium, sodium, potassium, ammonium, magnesium, barium, calcium, zinc and aluminium chlorides, bromides, iodides and chlorates, sodium and potassium chromates, potassium tetraiodomercurate and sodium and potassium thiocyanates.

Contraction can also be achieved by placing the membrane in contact with a dehydrating agent. Dehydrating agents are numerous and, so long as it is inert to the polymer, practically any compound with an affinity for water can be used. However, it has been found that excellent results can generally be obtained by treating the membrane with one or more compounds containing one or more alcoholic OH groups or with an aqueous solution of such a compound or compounds used in the liquid or vapour state at a temperature of between 20° and 80°. Thus aliphatic or cycloaliphatic, primary, secondary or tertiary monoalcohols or polyalcohols which contain from 1 to 20 carbon atoms or polyalkylene glycols can be used. The duration of this treatment is a function of the nature of the agent and of the temperature. In general, it can vary between 10 seconds and 24 hours. In the particular case of ethanol at a temperature of between 40° and 70°, it usually varies between 30 seconds and 3 minutes.

These treated membranes naturally also form part of this invention. A surface examination of these membranes under an electron microscope at a magnification of 20,000 does not reveal the existence of a single pore on one of the faces of the membranes. On the other face, on the other hand, the presence of pores, the average diameter of which varies between 0.1 and 1 $\mu$, can be observed. An examination in cross-section reveals the existence of a dense and extremely thin layer corresponding to the non-porous surface, and a much thicker layer containing numerous pores.

A study of the osmotic properties of such a membrane, by comparison with the properties of a membrane produced by simple casting of a solution of the same polymer and evaporating the solvent (a so-called dense membrane), enables the thickness of the active dense layer, that is to say the layer which is free of pores, to be estimated. The comparison can be made for the flow of rate, for an identical degree of rejection. The thickness of the dense layer of the membranes described above, estimated according to this method, is usually between 0.01 and 0.5 $\mu$.

These membranes of the present invention can also be dried. They can be used, in particular, for the fractionation of salt solutions, for example sea water, by reverse osmosis. The degree of salt rejection of these membranes is usually greater than 75% and can exceed 90%; the flow rate can exceed 1,000 l/day.m² under a pressure of 60 bars.

Apart for desalinating sea water, the membranes are of considerable value in the treatment of industrial waters containing other salts, in particular salts of calcium and magnesium, especially the carbonates and bicarbonates.

The apparatuses which may contain these membranes are of any known type. In particular, the apparatuses described by ULRICH MERTEN in "Desalination by Reverse Osmosis" (p. 239–270; 1966) edited by "The Riverside Press," or SOURIRAJAN "Reverse Osmosis," Logos Press Ltd., 1970, can be used.

The following Examples further illustrate the present invention.

EXAMPLES 1 to 21

A solution A is prepared by dissolving 12.5 g. of polyaryl ether/sulphone in 150 cm³ of 1,2-dichloroethane (DCE). The polyaryl ether/sulphone used contains a plurality of units of the formula:

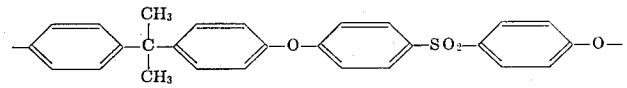

A solution B is prepared by dissolving 3.3 g. of chlorosulphuric acid (HClSO₃) in 30 cm³ of DCE.

The two solutions A and B are introduced simultaneously and gradually (over a period of one hour), with vigorous stirring (436 revolutions/minute) into a 500 cm³ flask, equipped with a stirrer, held at −10°C. and containing 50 cm³ of DCE. The stirring is continued and the temperature is maintained for a further 4 hours. The precipitate is filtered off and washed with 100 cm³ of DCE. It is redissolved in 50 cm³ of dimethylformamide (DMF) at ambient temperature. This solution is poured into 500 cm³ of water. It is filtered and washed 3 times with 300 cm³ of water (each time), and dried at 60°C./100 mm.Hg. A sulphonated polysulphone is thus obtained.

Several polymers are prepared by this method; the reduced specific viscosity (RV) and the proportion of sulphonic acid groups of these are indicated in Tables 1 to 3 below. The reduced specific viscosity is measured in a 2 g/l solution in DMF and is expressed in cm³/g.

Various solutions of these polysulphones are prepared: the nature, the proportions of the solvents, and the concentration of these solutions are given in the Tables which follow.

Each of these solutions is cast on a glass plate, and then the film thus formed in gelled. The gelling conditions are indicated hereafter. "Air" indicates that the film was simply left in air at the indicated temperature. The films are then immersed in a coagulation bath. The composition of the bath, the temperature and the duration of the immersion are also given in the Tables. The thickness of the membranes after coagulation (T) and the thickness of the dense layer (t), determined as indicated above, are also indicated.

The membranes then undergo a treatment to modify their osmotic properties. Certain membranes are immersed in a solution containing 100 g. of water per 50 g. of sodium nitrate (treatment "O"); others are immersed in alcoholic solutions (A.S.) as indicated in the Tables.

The membranes described above are used for the desalination, by reverse osmosis, of a brine containing 35 g. of NaCl/litre. The device used is that described in Reverse Osmosis S. SOURIRAJAN, (Logos Press Limited 1970 — p. 26). The flow rate and the degree of salt rejection are indicated in the Tables. During the reverse osmosis, which lasts 2 hours, the temperature of the brine is 24°C., the pressure is 60 bars, the rate of recirculation of the brine is 43 litres/hour.

It should be noted that all the membranes produced in these various Examples have, on their porous face, pores of average diameter of between 0.1 and 1 $\mu$, and their dense face does not show a single pore when examined under an electron microscope at a magnification of 20,000.

EXAMPLE 22

A membrane of sulphonated polyaryl ether/sulphone, prepared under the conditions of Example 9 up to the coagulation, is used. Immediately after this coagulation, the membrane is used for the isolation of bovine albumin of molecular weight 70,000 in an aqueous solution of concentration 1 g/1 by ultrafiltration under a pressure of 2 bars: the degree of rejection is 100% and the flow rate is 505 1/day.m².

EXAMPLE 23

A reverse osmosis is carried out, by means of the device used in the preceding Examples, on water of a total hardness (TH) of 27.1° (calcium and magnesium carbonates and bicarbonates). The conditions for the osmosis are those described in the previous Examples (pressure 60 bars; duration 4 hours).

The results obtained are as follows:

With the membrane of Example 2:
    Flow rate: 300 1/day.m²
    Degree of rejection of calcium: 98.5%
    Degree of rejection of magnesium: 97.6%
    TH of diffused water: 0.45°

With the membrane of Example 3:
    Flow rate: 650 1/day.m²
    Degree of rejection of calcium: 98.5%
    Degree of rejection of magnesium: 97.6%
    TH of diffused water: 0.45°

EXAMPLE 24

The experiment of Example 23 is repeated, under a pressure of 80 bars, increasing the duration of the operation to 88 hours. After 68 hours, the membranes are washed with normal hydrochloric acid for 1 hour (still under 80 bars). After 72 hours, the membranes are removed from the apparatus, cleaned by means of a silk brush and are then put back into place.

Membrane No. 1 is that of Example 9.
Membrane No. 2 is that of Example 10.

TABLE 1

| Example | Casting solution - Polymer RV (cm.³/g.) | Sulphonic acid (meq./g.) | Solvent/non-solvent Nature | Proportions (g.) | Concentration (percent) | Gelling Medium | Gelling Temp. (°C.) | Gelling Duration (minutes) | Coagulation - Nature of the bath and duration of the treatment | Coagulation Temp. (°C.) | Membrane T (μ) | Membrane t (μ) | Modification treatment Type | Modification T (°C.) | Modification Duration (minutes) | Flow rate (l./day·m.²) | Degree of rejection of salt percent |
|---|---|---|---|---|---|---|---|---|---|---|---|---|---|---|---|---|---|
| 1 | 73 | 0.83 | Dimethylformamide / Acetone / LA-DETA* / Water | 45 / 8 / 2 / 2 | 40.5 | Air | 20 | 0.5 | Water, 10 min. | 1 | 150 | 0.01 | "O" | 135 | 15 | 900 | 84.4 |
| 2 | 73 | 0.83 | DMF / Acetone / LA-DETA* / Water | 40 / 8 / 2 / 2 | 40 | Air | 20 | 0.5 | do | 2 | 230 | 0.23 | "O" | 135 | 15 | 263 | 83 |
| 3 | 73 | 0.83 | DMF / Acetone / LA-DETA* / Water | 40 / 8 / 2 / 2 | 40.5 | Air | 20 | 0.1 | do | 1 | 200 | 0.11 | "O" | 135 | 15 | 565 | 78 |
| 4 | 73 | 0.83 | DMF / Dichloromethane / LA-DETA* / Water | 40 / 8 / 2 / 2 | 40.5 | Air | 20 | 0.1 | do | 1 | 240 | 0.16 | "O" | 135 | 15 | 360 | 78 |
| 5 | 73 | 0.83 | DMF / Acetone / LA-DETA* / Water | 40 / 8 / 2 / 2 | 40.5 | Air | 20 | 2 | do | 25 | 150 | 0.18 | "O" | 135 | 15 | 339 | 89.2 |

*Product of the reaction of 4 mols of lactic acid with 1.66 mols of diethylenetriamine.

TABLE 2

| Example | Casting solution - Polymer RV (cm.³/g.) | Sulphonic acid (meq./g.) | Solvent/non-solvent Nature | Proportions (g.) | Concentration (percent) | Gelling Medium | Gelling Temp. (°C.) | Gelling Duration (minutes) | Coagulation - Nature of the bath and duration of the treatment | Coagulation Temp. (°C.) | Membrane T (μ) | Membrane t (μ) | Modification treatment Type | Modification T (°C.) | Modification Duration (minutes) | Flow rate (L./day·m.²) | Degree of rejection of salt (percent) |
|---|---|---|---|---|---|---|---|---|---|---|---|---|---|---|---|---|---|
| 6 | 73 | 0.83 | DMF / Methyl ethyl ketone (MEK) / LA-DETA* / Water | 40 / 8 / 2 / 2 | 40.5 | Air | 20 | 2 | Water, 10 min. | 25 | 150 | 0.08 | "O" | 135 | 15 | 730 | 80.6 |
| 7 | 73 | 0.83 | DMF / MEK / LA-DETA* / Water | 45 / 9 / 2.5 / 3.5 | 50 | Air | 20 | 2 | do | 26 | 120 | 0.13 | "O" | 135 | 15 | 452 | 77.8 |
| 8 | 73 | 0.83 | As Example 7 | | | Air | 20 | 1 | do | 48 | 150 | 0.09 | "O" | 135 | 15 | 675 | 76.1 |
| 9 | 73 | 0.83 | As Example 7 | | | Air | 20 | 1 | do | 30 | 150 | 0.13 | "O" | 135 | 15 | 475 | 82.8 |
| 10 | 62 | 0.90 | As Example 7 | | | Air | 20 | 1 | do | 28 | 150 | 0.13 | "O" | 135 | 15 | 460 | 84.4 |
| 11 | 65 | 0.88 | As Example 7 | | | Air | 20 | 1 | do | 28 | 150 | 0.13 | "O" | 135 | 15 | 530 | 87.1 |
| 12 | 73 | 0.83 | DMAC / Acetone / LA-DETA* / Water | 40 / 8 / 2 / 2 | 50.5 | Air | 20 | 0.5 | do | 1 | 200 | 0.14 | "O" | 135 | 15 | 418 | 75.2 |
| 13 | 73 | 0.83 | DMAC / Dichloromethane / LA-DETA* / Water | 40 / 8 / 2 / 2 | 50.5 | Air | 20 | 0.5 | do | 1 | 230 | 0.13 | "O" | 135 | 15 | 482 | 75.5 |

*See Table 1.

TABLE 3

| Ex. | Polymer | | Casting Solution | | | Gelling | | |
|---|---|---|---|---|---|---|---|---|
| | RV cm³/g | Sulphonic acid meq/g | Solvent/non-solvent Nature | Proportions | Concentration % | Medium | Temp. °C | Duration minutes |
| 14 | 73 | 0.83 | DMAC Ethylene carbonate LA-DETA* | 100 g 60 g 8 g | 53.5% | air | 20°C | 0.5 |
| 15 | 73 | 0.83 | DMF Ethylene carbonate LA-DETA* Water | 100 g 60 g 8 g 10 g | 50.5% | air | 20°C | 0.5 |
| 16 | — | | | | as | Example | | 11 |
| 17 | | | | | as | Example | | 11 |
| 18 | | | | | as | Example | | 11 |
| 19 | | | | | as | Example | | 11 |
| 20 | | | | | as | Example | | 11 |
| 21 | | | | | as | Example | | 11 |

TABLE 3 — Continued

| Ex. | Coagulation Nature of the bath and duration of the treatment | Temp. °C | Membrane T μ | t μ | Modification treatment Type | T °C | Duration minutes | Flow rate (l/day.m²) | Degree of rejection of salt (%) |
|---|---|---|---|---|---|---|---|---|---|
| 14 | Water 10 mins. | 20°C | 180 | 0.095 | "0" | 130 | 15 | 635 | 78.2% |
| 15 | Water 10 mins. | 24°C | 170 | 0.075 | "0" | 130 | 15 | 800 | 79.5% |
| 16 | | | | 0.09 | AS | | (1) | 670 | 80.4% |
| 17 | | | | 0.31 | AS | | (2) | 192 | 91.3% |
| 18 | | | | 0.045 | AS | | (3) | 1350 | 77.5% |
| 19 | | | | 0.15 | AS | | (4) | 405 | 92.6% |
| 20 | | | | 0.08 | AS | | (5) | 720 | 82.2% |
| 21 | | | | 0.06 | AS | | (6) | 1030 | 76.5% |

(1) Immersion of the membrane for 1 minute in an ethanol-water solution (90/10 by weight) at 60°C.
(2) Immersion of the membrane for 30 seconds in an ethanol-water solution (90/10 by weight) at 55°C.
(3) Immersion of the membrane for 30 seconds in an ethanol-glycerol solution (90/10 by weight) at 55°C.
(4) Immersion of the membrane for 45 seconds in an ethanol-glycerol solution (90/10 by weight) at 55°C.
(5) Immersion of the membrane for 40 seconds in an ethanol-glycerol-decanol solution (85/10/5 by weight) at 55°C.
(6) Immersion of the membrane for 5 hours in an ethanol-glycerol solution (90/10 by weight) at 50°C.

The results are given in Table 4. [DR (Ca) and DR (Mg) denote, respectively, the degree of rejection of the calcium and magnesium salts and TH denotes the total hardness of the diffused water].

The total hardness of the water before osmosis is 31°.

EXAMPLE 25

In order to illustrate the stability of the membranes in a strongly basic medium, the membranes prepared according to Examples 5 and 4 (referred to as membrane 1 and membrane 2, respectively) are immersed in the effluents from a paper mill (pH = 12). The flow rate and degree of rejection of NaCl (pressure 60 bars) of these membranes are measured periodically.

The results of these measurements are given in the Table which follows:

| After a period of | Membrane 1 | | Membrane 2 | |
|---|---|---|---|---|
| | Flow rate l/day.m² | Degree of rejection | Flow rate l/day.m² | Degree of rejection |
| 0 hrs. | 276 | 92.3% | 330 | 82.7% |
| 235 hrs. | 350 | 73.6% | 319 | 78% |
| 475 hrs. | 306 | 83.7% | 273 | 79.4% |
| 627 hrs. | 296 | 81% | 278 | 86.2% |
| 819 hrs. | 304 | 81.2% | 270 | 82.8% |
| 1515 hrs. | 240 | 81.2% | 232 | 87.6% |
| 2160 hrs. | 320 | 83% | 295 | 83.6% |
| 3200 hrs. | 282 | 82.8% | 295 | 81.1% |

TABLE 4 (EXAMPLE 24)

| Hour of operation | Membrane No. 1 | | | | Membrane No. 2 | | | |
|---|---|---|---|---|---|---|---|---|
| | Flow rate l/day.m² | DR (Ca)% | DR (Mg)% | TH° | Flow rate l/day.m² | DR (Ca)% | DR (Mg)% | TH° |
| 1 | 890 | 96.4 | 95.3 | 1.44 | 670 | 98.6 | 97.2 | 0.5 |
| 66.5 | 590 | 98.6 | 98.0 | 0.35 | 510 | 99.36 | 99.1 | 0.28 |
| 68 | | | | | | | | |
| 70 | 585 | 99.65 | 99.5 | 0.11 | 510 | 99.5 | 99.3 | 0.27 |
| 71 | 560 | 99.34 | 99.3 | 0.20 | 495 | 99.5 | 99.2 | 0.28 |
| 72 | | | | | | | | |
| 88 | 618 | 98.3 | 98.5 | 0.35 | 550 | 96 | 95 | 1.5 |

I claim:

1. Process for preparing an anisotropic sulphonated polyaryl ether/sulphone membrane which comprises the following steps, in sequence:
   i. casting a solution containing from about 0.1 to 10% by weight of an amine salt and having a concentration between about 5 and 60% w/v of solution of a sulphonated polyaryl ether/sulphone possessing between about 0.1 and 2 meq/g of sulphonic acid groups and a reduced specific viscosity of between about 40 and 200 cm³/g (measured as a 2 g/l solution in dimethylformamide at 25°C), on a support;
   ii. gelling the polymer layer formed on the support in the step (i);
   iii. immersing the supported film from step (ii) in water, as a coagulation bath, said bath having a temperature between about 0°C. and 100°C., for between about 30 seconds and 60 minutes; and
   iv. recovering the membrane produced from step (iii).

2. Process according to claim 1 in which the sulphonated polyaryl ether/sulphone contains a plurality of units of the formula

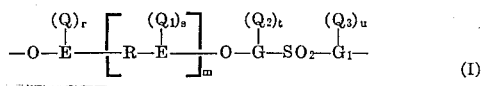
(I)

and, optionally, units of the formula:

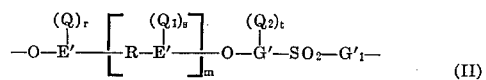
(II)

in which:
   each of E, G and $G_1$, which may be identical or different, is an aromatic group at least one of which comprises, as a substituent, one or more sulphonic acid groups, the number of sulphonic acid groups attached to each aromatic group being the same or different;
   each of E', G' and $G'_1$, which may be identical or different, are the same as E, G and $G_1$ except that they do not contain sulphonic acid groups;
   each of Q and $Q_1$, which may be identical or different, represents a substituent which is inert to sulphonation reactions;
   each of $Q_2$ and $Q_3$, which may be identical or different, represents an electron-attracting goup;
   each of $r, s, t$ and $u$, which may be identical or different, is 0 or an integer from 1 to 4, at least one of them being less than 4;
   $m$ is 0 or 1; and
   R represents a valency bond or a radical selected from —CO—, —O—, —SO₂— and divalent organic hydrocarbon radicals.

3. Process according to claim 2 in which Q and/or $Q_1$ represents an alkyl radical of 1 to 4 carbon atoms or a halogen atom.

4. Process according to claim 2 in which $Q_2$ and/or $Q_3$ represents a nitro, phenylsulphone, alkylsulphone, trifluoromethyl, nitroso or pyridyl group.

5. Process according to claim 2 in which R represents an alkylene, alkylidene, cycloalkylene or arylene radical of less than 7 carbon atoms.

6. Process according to claim 2 in which E, G and $G_1$ each represents a p-phenylene radical at least one of which carries one or more sulphonic acid groups, E', G' and $G'_1$ each represents a p-phenylene radical, $r, s, t$ and $u$ are 0, $m$ is 1 and R represents

7. Process according to claim 1 in which the casting solution contains one or more solvents for the polymer which are aprotic polar solvents, 0 to 50%, based on the total weight of the liquids, of a solvent or swelling agent for the polymer, of boiling point less than about 90°C., and 0 to 10%, based on the total weight of the liquids, of a non-solvent for the polymer.

8. Process according to claim 7 in which the aprotic polar solvent is dimethylformamide, dimethylacetamide or ethylene carbonate, the solvent having a boiling point less than 90°C. is acetone, dichloromethane or methyl ethyl ketone and the non-solvent is water.

9. Process according to claim 1 in which the amine salt is a salt formed by an anion of a strong inorganic acid and a cation derived from an amine, or a salt produced by reacting a carboxylic polyacid or a carboxylic hydroxyacid with a polyamine.

10. Process according to claim 9 in which the salt is derived from lactic acid and diethylenetriamine.

11. Process according to claim 1 in which the coagulation is carried out at a temperature of between 0° and 60°C. for between 5 seconds and 60 minutes.

12. Process according to claim 1 in which the solution is cast onto a support which is covered by a woven, non-woven or knitted fabric, this fabric becoming incorporated in the membrane.

13. Process according to claim 1 in which the membrane is heat-treated.

14. Process according to claim 13 in which the heat treatment consists of treating the membrane for 1 to 60 minutes with an aqueous solution of an inorganic salt, at a temperature of between 100° and 150°C.

15. Process according to claim 14 in which the inorganic salt is sodium nitrate.

16. An anisotropic membrane produced by a process as claimed in claim 13.

17. Process according to claim 1 in which the membrane is also dehydrated.

18. Process according to claim 17 in which the membrane is dehydrated with a compound or mixture of compounds containing at least one alcoholic OH group for between 10 seconds and 24 hours at a temperature of between 20° and 80°.

19. An anisotropic membrane produced by a process as claimed in claim 17.

20. An anisotropic membrane produced by a process as claimed in claim 1.

21. Method of fractionating a solution by direct or reverse osmosis or ultrafiltration in which the membrane used is one obtained by a process claimed in claim 1.

22. Process according to claim 1 in which the coagulation bath is an aqueous solution containing about 0.1 to 10% by weight of an amine salt.

23. Method of fractionating a solution by direct or reverse osmosis or ultrafiltration in which the membrane used is one obtained by a process claimed in claim 22.

* * * * *